(12) United States Patent  (10) Patent No.: US 6,669,411 B2
Salley, Jr.  (45) Date of Patent: *Dec. 30, 2003

(54) ROTARY AIR LOCK FEEDER WITH IMPROVED MATERIAL INTAKE AND DISCHARGE

(76) Inventor: Francis Walker Salley, Jr., 1450 Mill Place Dr., Dacula, GA (US) 30019-1292

(*) Notice: Subject to any disclaimer, the term of this patent is extended or adjusted under 35 U.S.C. 154(b) by 0 days.

This patent is subject to a terminal disclaimer.

(21) Appl. No.: 10/269,342

(22) Filed: Oct. 11, 2002

(65) Prior Publication Data

US 2003/0039515 A1 Feb. 27, 2003

Related U.S. Application Data

(63) Continuation of application No. 09/829,167, filed on Apr. 9, 2001, now Pat. No. 6,471,447.

(51) Int. Cl.$^7$ ................................................ B65G 53/08
(52) U.S. Cl. ...................................................... 406/64
(58) Field of Search ............................ 406/62, 63, 64, 406/65, 66, 67, 68; 222/630

(56) References Cited

U.S. PATENT DOCUMENTS

| 1,437,863 | A | | 12/1922 | Raymond |
|---|---|---|---|---|
| 2,268,725 | A | | 1/1942 | Steel |
| 2,530,181 | A | | 11/1950 | Schilling |
| 2,886,216 | A | | 5/1959 | Oholm |
| 3,130,879 | A | * | 4/1964 | Messing ..................... 222/368 |
| 3,219,393 | A | * | 11/1965 | Starrett ......................... 406/64 |
| 3,574,411 | A | * | 4/1971 | Miller ......................... 222/365 |
| 3,955,486 | A | * | 5/1976 | Strommer .................. 99/323.4 |
| 4,180,188 | A | | 12/1979 | Aonuma et al. |
| 4,267,946 | A | | 5/1981 | Thatcher |
| 4,268,205 | A | | 5/1981 | Vacca et al. |
| 4,710,067 | A | | 12/1987 | Salley |
| 5,299,888 | A | | 4/1994 | Wysong et al. |
| 5,584,322 | A | | 12/1996 | Poschl et al. |

* cited by examiner

Primary Examiner—Joseph A. Dillon
(74) Attorney, Agent, or Firm—Troutman Sanders LLP; Wm. Brook Lafferty

(57) ABSTRACT

An improved rotary air lock feeder. The improved device includes a cylinder having a central axis. A plurality of vanes extending radially outward to rotate in the cylinder about the axis. A hopper communicates with the cylinder through an inlet located in an upper portion of the cylinder. The present invention permits flow of material from the hopper to the cylinder without the use of a worm conveyor positioned in the bottom of the hopper. An offset opening extends from the upper portion of the cylinder along a side of a vertical plane extending from the axis. The offset opening communicates with the cylinder to intermittently provide inter-chamber communication at the offset opening.

25 Claims, 6 Drawing Sheets

ROTARY AIR LOCK FEEDER WITH IMPROVED MATERIAL INTAKE AND DISCHARGE

RELATED APPLICATION

This application is a continuation of U.S. Ser. No. 09/829,167, filed Apr. 9, 2001 now U.S. Pat. No. 6,471,447, entitled "Rotary Air Lock Feeder with Improved Material Intake and Discharge" which is incorporated herein by reference.

TECHNICAL FIELD

The present invention relates to rotary air lock feeders. This invention more particularly pertains to discharging materials such as insulation in a relatively continuous and even manner.

BACKGROUND OF THE INVENTION

Rotary air lock feeders typically include a hopper mounted over a cylinder. Material placed in the hopper falls through the hopper down into the cylinder. The material is gravity fed down to a rotor within the cylinder. The rotor has multiple vanes which revolve about an axis in the center of and extending along the length of the cylinder. The material falls between two adjacent vanes that form a revolving chamber. At least four vanes are required to hermetically isolate the hopper from discharge pressure. The cylinder also includes opposing end walls which form mutually aligned inlet and outlet ports. High pressure air passes through the chamber and discharges the material through the outlet port.

Rotary air lock feeders are distinguishable from metering valves because metering valves do not include blowers. In other words, the material passing through metering valves typically passes through a slot running at the bottom of the entire length of the cylinder dependent entirely on gravity, whereas the material passing through a rotary feeder passes through a port at the end of a chamber in an air-train moving from the inlet port to the outlet port and into a hose that conveys the material to a point of application.

Numerous attempts have been made to create a better rotary lock feeder. For example, the rotor might be made to rotate faster to discharge more material but eventually the rotor will reach a point where it spins so rapidly that the material cannot fall in. A longer feeder might be made to accept larger amounts of material to increase the rate of flow of material but they tend to clog and bring the flow to a stop.

In known rotary air-lock feeders, the material then falls into a worm conveyor which is in a trough at the bottom of the hopper. The worm conveyor follows only a portion of the length of the hopper. The remainder includes a multi-vane rotor which substantially corresponds with the length of its cylinder. The multi-vane rotor deflects the material down into fast rotating times within a drop box beneath the hopper in which tines will further separate the material and then allow it to drop into the cylinder.

Brands of fiberglass insulation differ according to weight and compressibility. Some insulation bales break up freely and expand greatly. Others have to be pulled apart and lie flat when separated. Bales of material are dropped into the hopper where paddle wheels in the hopper separate and chew it up.

Light weight, highly compressible material, like some new makes of insulation, expands too greatly to fall quickly into the conveyor of these known machines. The conveyor cannot attack the insulation while it is in large, dense chunks. Rather, it moves light, small, separated bundles of insulation that settle out and fall into it. Consequently, the known machines are slow with this kind of material.

Heavy, dense insulation that is manufactured so as not to expand greatly falls more quickly in known machines. The material, however, accelerates the time to failure of drive train components, feeder seals and rotating elements.

Typically, known feeders have discharge ports which permit gravity to facilitate the movement of the material into the region between the ports rather than permit the speed of rotation of the vanes in the cylinder to introduce the material between the ports, limiting the length of a feeder and thus its capacity and speed. Also, these known feeders often fail to pneumatically isolate the high pressure of the air-train between the ports from the hopper. Escaping air often blows back into the hopper, interfering with and slowing the passage of material from the hopper into the cylinder.

SUMMARY OF THE INVENTION

The present invention solves the above-identified problems by providing an improved rotary air lock feeder. The present invention seeks to provide efficient discharging of various types of material, while satisfying the need to discharge the material in a relatively continuous and even manner.

Generally described, the present invention includes a rotary air lock feeder for delivering a material, such as insulation, in substantially an even and continuous manner. The feeder includes a cylinder having a central axis. A multi-vaned rotor is rotatably positioned within the cylinder so that the vanes of the rotor extend radially outward from its axis of rotation which is the center of the cylinder. A hopper communicates with the cylinder through a slotted inlet located in an upper portion of the cylinder for its entire length. A slotted opening offset on one side of the hopper extends along the length of the cylinder.

In accordance with one embodiment of the present invention, the feeder includes a pathway for air at the entrainment pressure from the interior and exterior of the feeder without passing through the outlet port or back through the hopper. The offset opening allows air pressure to escape without going into the hopper where it would interfere with the fall of material.

In accordance with another embodiment of the present invention, to control the introduction of material without significant interference from gravity, the outlet port in the end of the cylinder is defined by outermost and innermost edges defined by increasing and decreasing radii, respectively, relative to the axis of rotation which is the center of the cylinder.

The present invention includes a multi-vaned rotor, unlike a conventional worm conveyor, that does not need a trough in which to operate, and therefore can be placed higher in the hopper to increase the multi-vane's exposure. To handle extreme kinds of material, the present invention varies the exposure of the multi-vaned rotor to the insulation in the hopper by raising or lowering the multi-vaned rotor's position in the hopper.

The foregoing has outlined rather broadly, the more pertinent and important features of the present invention. The detailed description of the invention that follows is offered so that the present contribution to the art can be more fully appreciated. Additional features of the invention will be described hereinafter. These form the subject of the claims of the invention. It should be appreciated by those skilled in the art that the conception and the disclosed specific embodiment may be readily utilized as a basis for

BRIEF DESCRIPTION OF THE DRAWINGS

Similar reference characters refer to similar parts throughout several views of the drawings.

DETAILED DESCRIPTION

Figure 1:
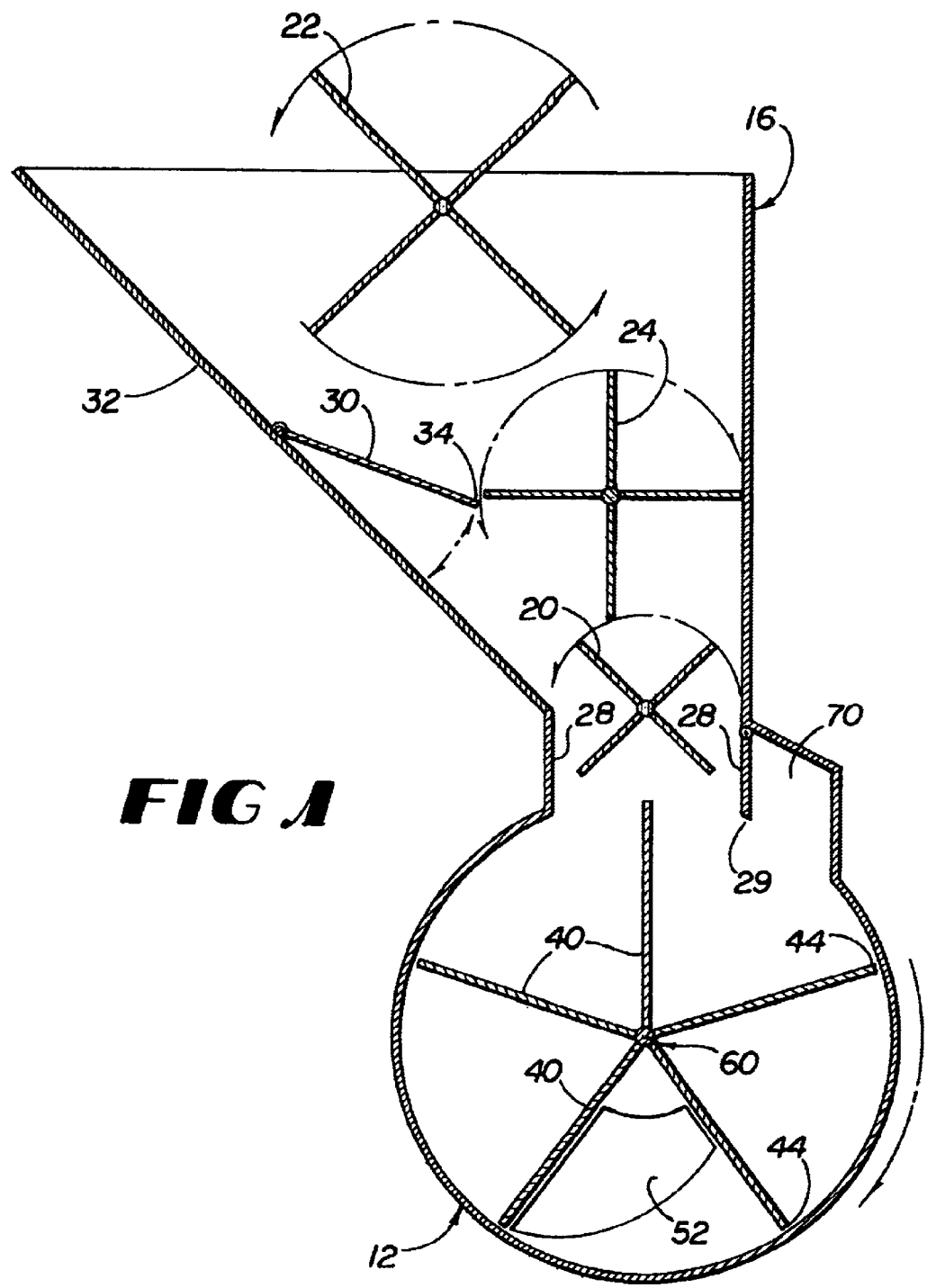
FIG. 1 is front cross-sectional view of one embodiment of the rotary air lock feeder of the present invention.
Figure 2:
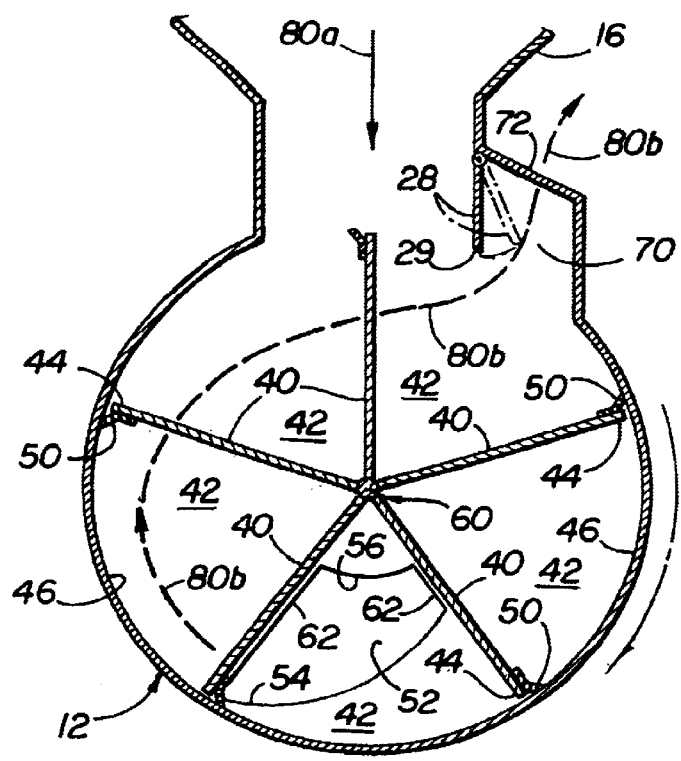
FIG. 2 is a close-up view of the path materials take while passing through the rotary air lock feeder of FIG. 1.
Figure 3:
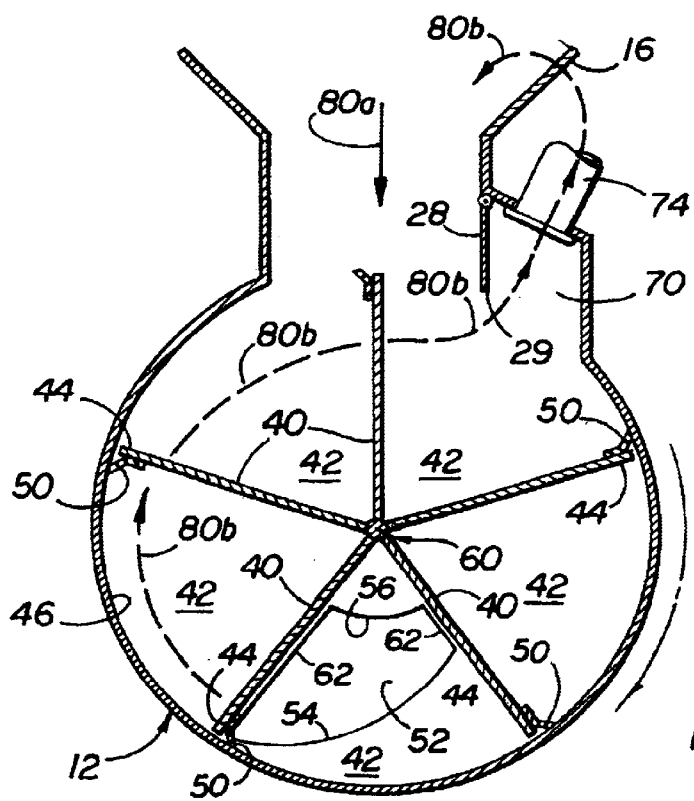
FIG. 3 is a front cross-sectional view of an alternative embodiment of the rotary air lock feeder of the present invention.
Figure 4:
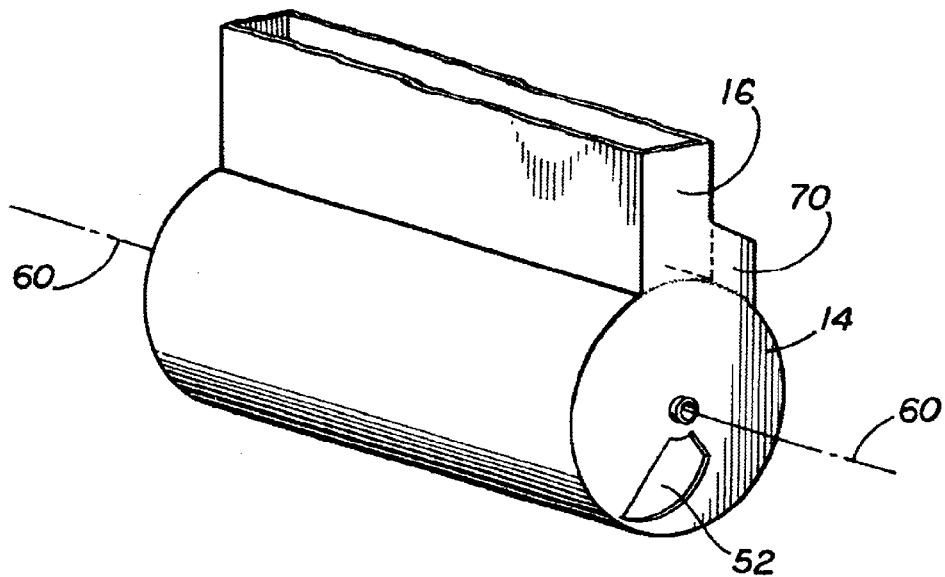
FIGS. 4 and 5 illustrate side perspective views of the feeders of FIGS. 2 and 3, respectively.
Figure 5:
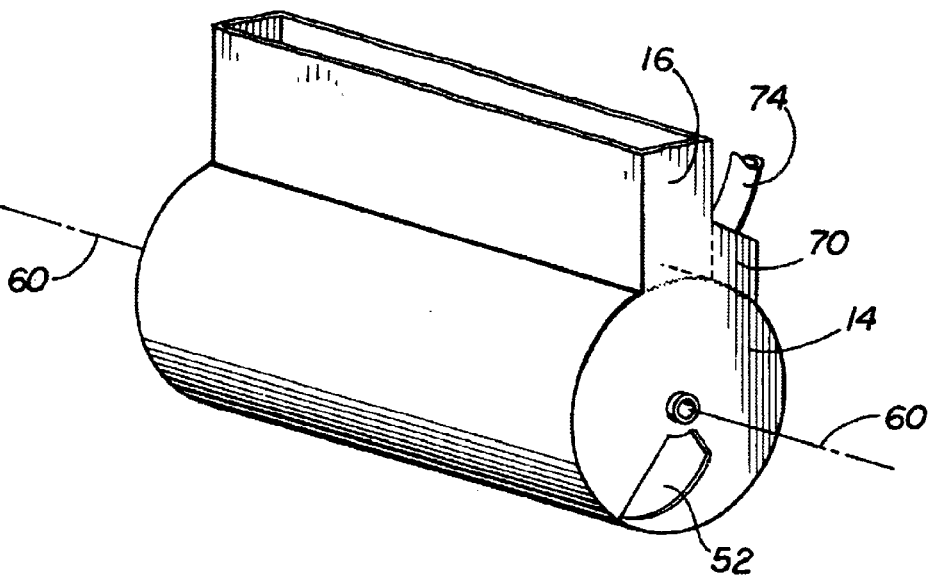

Referring now to the drawings in which like numerals indicate like elements throughout the several views, FIG. 1 illustrates an exemplary embodiment of a rotary air lock feeder 10. Generally described, the rotary air lock feeder 10 includes a cylinder 12 having a circular interior sidewall and opposing end walls 14 (FIGS. 4 and 5). The cylinder 12 and associated parts described below are sometimes referred to as constituting a feeder. One of the end walls 14 defines an outlet port, as best shown in FIGS. 2 and 3, for discharging the material from the feeder 10 in the desired manner. The outlet port is described in greater detail below. A hopper 16 is positioned above the chamber 12 to direct material into a slotted opening in the top of the cylinder 12. Preferably, the cylinder 12 is as long as the hopper 16 (FIGS. 4 and 5). The upper portion of interior walls of the hopper 14 may be vertically oriented or instead converge into the opening in the cylinder 12.

During the operation of the present invention, particulate material is fed into the top of the hopper 16 and the material gravitates into the cylinder 12. The paddle wheel 22 propels and separates large pieces of material into a multi-vane rotor 24. Its exposure may increased or decreased by raising or lowering its relative position to the sloped surface of the hopper. The high speed multi-tine rotor 20 separates the material and deflects it into the cylinder 12. The rotors 20, 24 and 22 may operate at independent speeds and direction. Preferably, the lowermost rotor 20, the one with multiple tines, rotates significantly faster than the other rotors positioned above it. The multi-vane rotor's 24 exposure may be increased or decreased by moving its position in any direction such as up, down, left or right in the hopper 16. Alternatively, the multi-vane rotor 24 may be in a fixed position within the hopper.

The reversible direction of one or more of the paddle wheels or multi-vaned rotors facilitates the use of different types of material through the hopper 16 and into the cylinder 12. As shown in FIG. 1, the multi-vaned rotor 20 and paddle wheel 22 rotate in a counter-clockwise direction while the center multi-vaned rotor 24 may operate in either direction. Please note that in the present invention, no worm conveyor is required which, therefore, allows the hopper 16 and the cylinder 12 to be substantially the same length, namely longer than a bale of material, which is approximately 44 inches.

Also, as best shown in FIGS. 2 and 3, the lowermost portions 28 of the sidewalls of the hopper 16 are preferably parallel, but one may pivot at its top or be flexible so that when the vanes in the cylinder 12 pass the distal lower end 29, greater clearance may be provided and material that might become impinged between the distal end 29 and the cylinder 12 might be brushed away. FIG. 2 illustrates the position of one lowermost portion 28 which is hinged to brush material from the ends of seals at the ends of vanes 40. The lowermost portion 28 is built far enough away from the interior 46 of the cylinder 12 to allow material which enters the cylinder 12 to fall below the distal end 29 so as not to be impinged between the advancing seal 50 and the interior 46 of the cylinder 12. This prevents obstruction of the rotation of the multi-vane rotor 60 and fracture of the seals 50. Also, this helps to prolong the life of the seals 50.

The hopper 16 of the present invention also includes a pivotally mounted surface 30 as shown in FIG. 1. The surface 30 allows the feeder 10 to compensate for the various types of material according to their densities. The exposure of the multi-vane rotor 24 to the material as it slides down the slope of the surface 30 is increased or decreased. The surface 30 pivots downward from a sidewall 32 of the hopper 16 and a distal end 34 of the surface 30 deflects material within the hopper 16 into the multi-vane rotor 24. Preferably, the surface 30 is actuated by hand by the user from the exterior of the hopper 16. The angle of the surface 30 relative to the sidewall from which it extends is selected based upon the type of material passing through the hopper 16. For example, a firm and dense material requires little exposure to the vanes on rotor 24 as the material passes through the hopper 16 whereas a resilient, light material might require more exposure to the vanes on the rotor 24. This change of exposure changes the depth of the sweep of the vanes on rotor 24 into the material. In order to change the amount of exposure of the vanes on rotor 24, the surface 30 is raised or lowered, within the hopper 16.

As the surface is raised, the normal force of the material on the surface is also increased. Since the sliding friction of the material is directly proportional to the normal force, the material is slowed in its advance toward the vanes on rotor 24. The amount of material being processed is reduced by the speed of its introduction as well as the decrease in the depth of the sweep of the vanes on rotor 24. A reduction of the amount of material being swept allows the processing of heavy, dense material without obstruction of the vanes on rotor 24 and their consequent stoppage.

As the surface 30 is lowered, the normal force of the material on the surface is decreased. The material is sped in its advance toward the vanes of the rotor 24. The amount of material being processed is increased by the speed of its introduction as well as the increase in the depth of the sweep of the vanes on rotor 24. An increase of the amount of material being swept allows for quicker processing of light, resilient materials, such as an insulation manufactured by Knauf, which does not obstruct the vanes on rotor 24.

Figure 9:
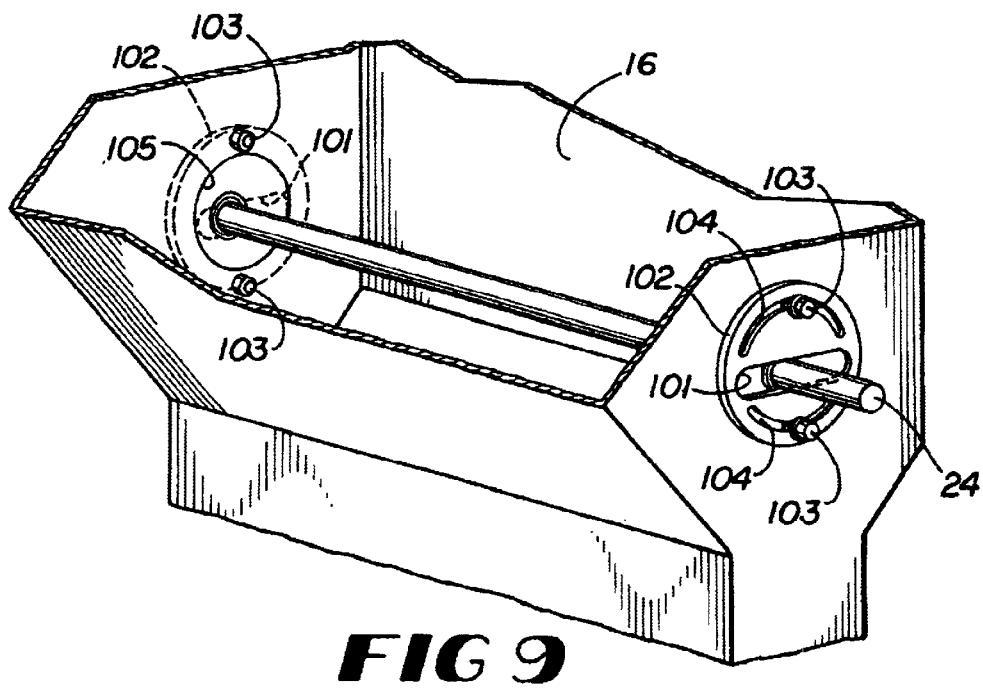
FIG. 9 is an end view showing one embodiment.

Referring to FIG. 9, each end of the rotor 24 can be mounted in a diametric slot 101 in a circular disk 102 that is placed over a smaller concentric hole 105 in each end of the hopper 16. The circular disks 102 are adjustably fixed to the hopper 16 with bolts 103 in arc-shaped slots 104 in the circular disks 102. The disks 102 can be rotated so that the rotor 24 can be moved back and forth in the slots 101 so as to allow positioning of the rotor 24 anywhere within the circumference of the disk 102. That is, the rotor 24 can be moved from one axis of rotation to another axis of rotation within the hopper 16. This is in contrast to a worm conveyor which must be in a trough at the bottom portion of the hopper in order to convey material laterally.

Within the cylinder 12 is another multi-vaned rotor having a plurality of vanes 40. The vanes 40 are spaced equidistant apart and a pair of adjacent vanes 40 define what is commonly referred to as a chamber 42. The number of vanes 40 is such that there is always one vane between the outlet port 52 and the place for the high entrainment pressure to escape. In known machines, this is the inlet from the hopper 16 to the cylinder 12. In the present invention, it is the leading edge of the first offset opening 70, in FIGS. 2 and 3. The vanes 40 of the rotor extend radially outward such that the distal ends 44 of the vanes 40 are proximate to the cylindrical interior side wall 46 of the cylinder 12.

The distal ends 44 of the vanes 40 within the cylinder 12 typically include seals 50. As the rotor rotates the vanes 40 within the cylinder 12, the material fed into the cylinder 12 from the hopper 16 is captured by chamber 42. As the chambers 42 revolve, each chamber 42 passes in turn over the outlet port 52 in the end wall 14 of the cylinder 12. The seals 50 and their vanes of a chamber 42 pneumatically isolate it from the hopper as the chamber 42 passes over the outlet port 52.

Figure 10:
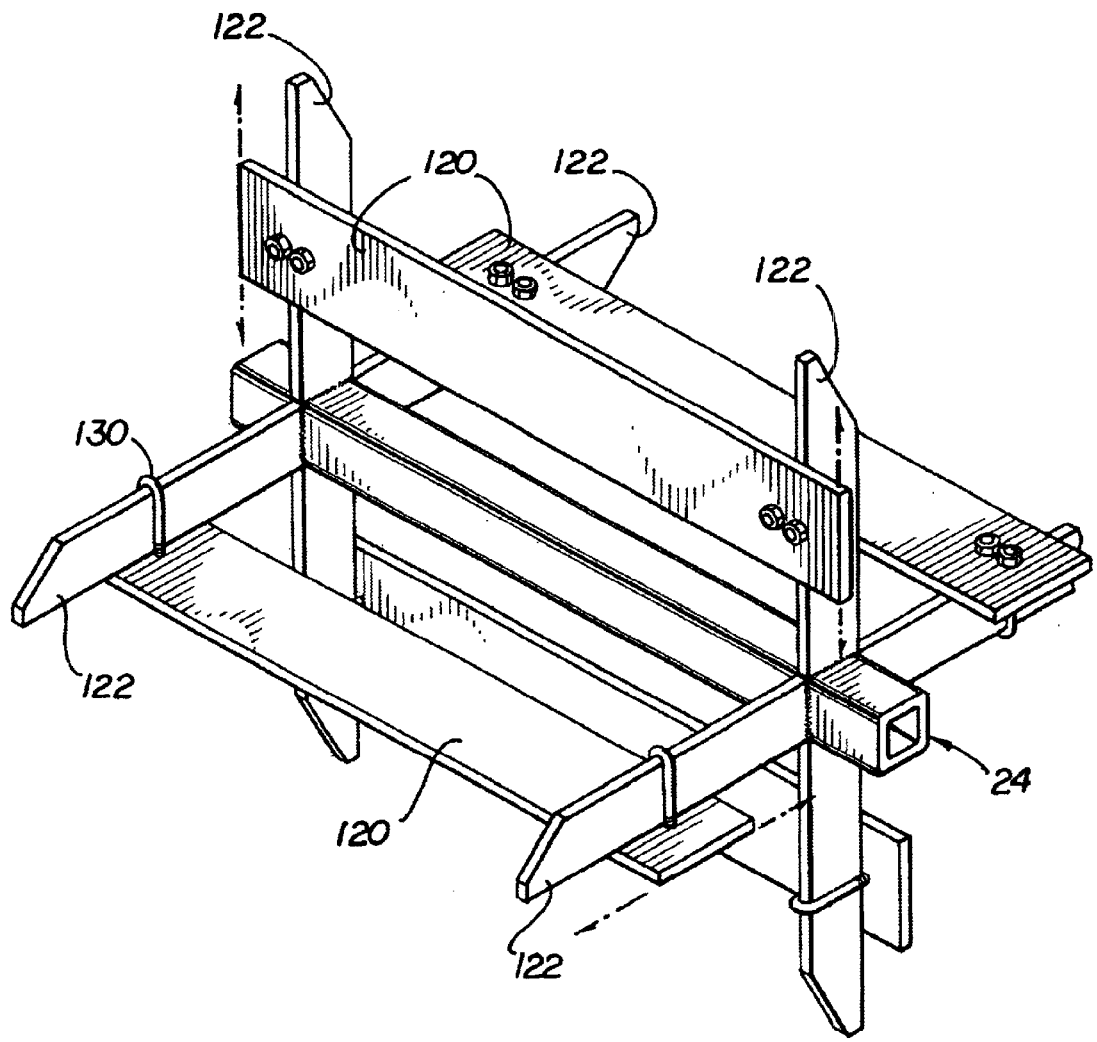
FIG. 10 is a perspective view of a rotor showing an alternative embodiment.

FIG. 10 illustrates an alternative embodiment for the vanes of rotor 24. Referring to FIG. 10, vanes 120 on rotor 24 can be displaced in and out on a radius related to the central axis of the rotor 24. The volume swept can then be changed according to the proximity of the vanes 120 from the center of the rotor 24. The vanes 120 can be adjustably mounted on radially extending tines 122 that extend from the center of the rotor 24 with fasteners such as u-bolts 130. The further out the vane 120 are from the central axis of rotor 24, the greater the volume of matter is swept.

The outlet port 52 is configured to minimize the influence of the acceleration due to gravity on the introduction of material between mutually aligned inlet and outlet ports. The outlet port 52 is defined by an outermost lengthwise edge 54 defined by an increasing radius relative to an axis 60 and the innermost lengthwise edge 56 of the outlet port 52 has a constant radius relative to the axis 60. Preferably, the outermost lengthwise edge 54 terminates tangent to the interior surface of the cylinder 12. The outlet port 52 is further defined by a pair of widthwise edges 62. Each of the widthwise edges 62 is substantially parallel to a vane 40 as each vane 40 passes each widthwise edge 62. In other words, the widthwise edges 62 extend along a radial line from the axis 60. Preferably, the inlet port is shaped to match the outlet port 52.

As explained in U.S. Pat. No. 4,710,067, hereby incorporated by reference, loose materials naturally exhibit an angle of repose. The angle of repose is the angle that the surface of a material takes with the horizontal once the material is formed into the pile by gravity flow.

As the leading vane 40 of a chamber 12 passes the edge 62 of the outlet port 52, the size of the outlet port 52 is small, with the outermost lengthwise edge 54 defined by the increasing-radius curve increasing from near the circle formed by the constant-radius curve. The amount of material that is first seen by the air-train and any that might fall into the air-train is small and can be moved by the air-train. As the vane revolves further, increasing amounts of material are exposed because of the shape of the outermost lengthwise edge 54 and are removed incrementally. At some point before tangency with the interior surface of the cylinder 12, the outermost lengthwise edge 54 defined by the increasing-radius curve will substantially equal the natural angle of repose of the material being processed, which will vary from one material to another. At that point, no further material will fall into place before the air-train and material will be introduced only by the speed of revolution of the vane.

Figure 6:
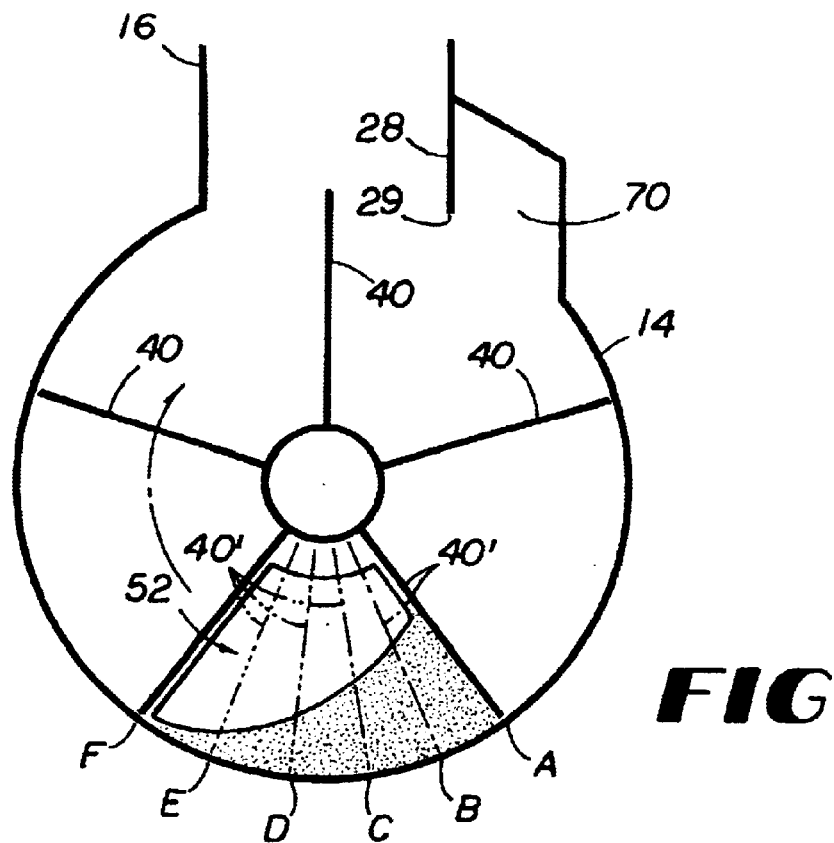
FIGS. 6 and 7 illustrate different positions of the rotor vanes relative to the port in the metering chamber according to the present invention.
Figure 7:
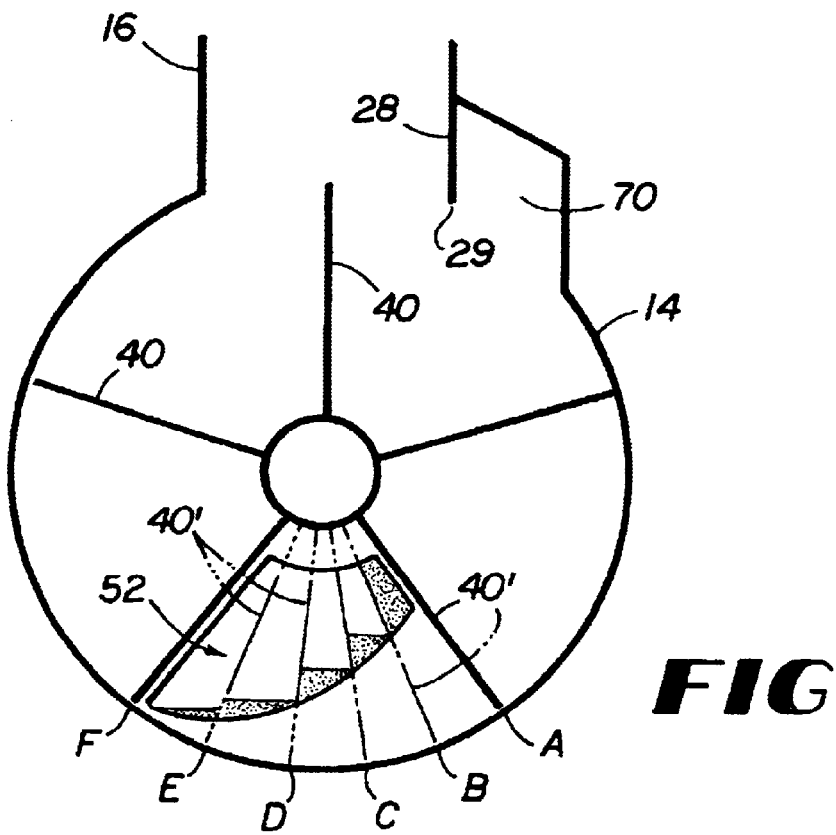
Figure 8:
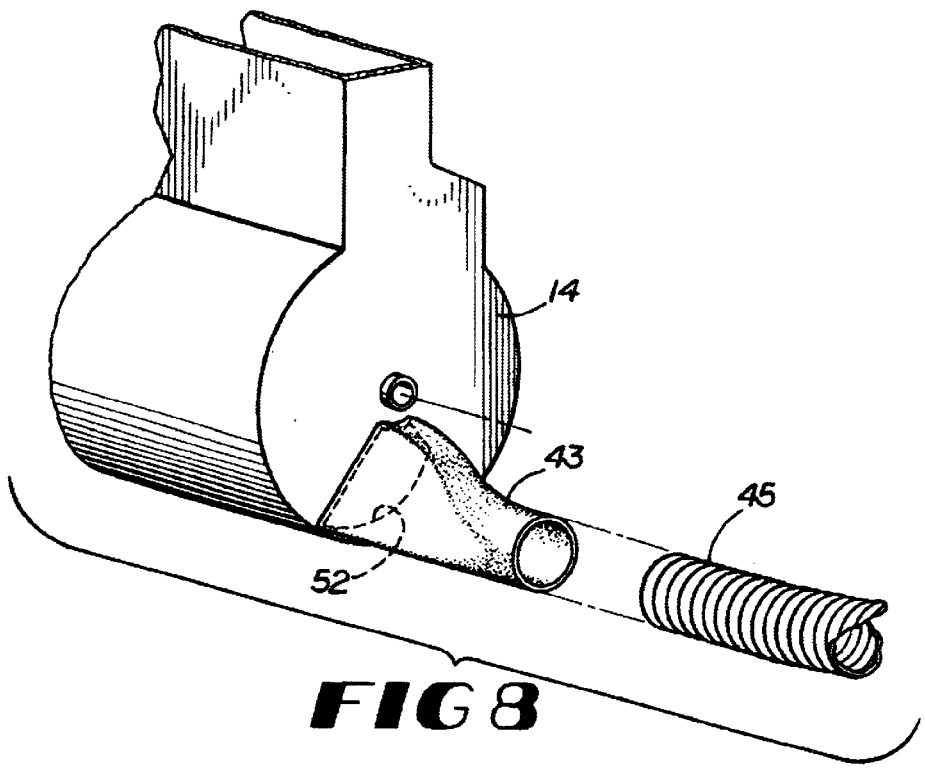
FIG. 8 is an orthographic projection showing a conduit that adapts the shape of the material outlet port to a cylinder for insertion into a hose-pipe.

FIG. 6 illustrates positions of a particular vane 40' as it moves along from points A–F. At point B, a small volume of material will be exposed to the air-train and will fall into it. At some point, C in the case of the material shown here, a line tangent to the outermost lengthwise edge 54 is less than the angle of natural repose of the material. From this point forward, the speed of the introduction of the material is determined by only the speed of revolution of the vane 40'. FIG. 7 graphically illustrates that, as the vane 40' revolves, even portions of material are removed from the surface of the pile of material along the outermost lengthwise edge 54 until the chamber 42 is completely emptied as the vane 40' reaches the end of the length of the outermost lengthwise edge 54 at point F. The outlet port 52 empties into a conduit 43 shown in FIG. 8, that changes from the shape of the outlet port 52 to a cylinder shaped connection to be attached to a hose-pipe 45.

The feeder 10 of the present invention also includes at least one offset opening 70 as best shown in FIGS. 2 and 3. The offset opening 70 extends as a slot from one end of the cylinder 12 to the other along each side of the opening from the hopper 16 to the cylinder 12. Preferably, the length of the offset opening 70 corresponds with the length of the cylinder 12. However, if there is more than one offset opening 70, only one of the offset openings 70, in the form of a slot, should be substantially the same length as the cylinder 12, preferably the second one in the direction of rotation. The offset opening 70 communicates with the interior of the cylinder 12. Note that the offset opening 70 is in communication with the hopper 16 as the vanes 40 revolve. The width of the offset opening 70 is sufficiently large to straddle each vane 40 as it revolves to intermittently allow concurrent communication with two adjacent chambers 42 as the feeder 10 rotates. In other words, the offset opening 70 is sized widthwise to straddle the width of each vane 40 as each vane 40 passes underneath. This contrasts with the size of the vent hole in my '067 patent.

After a chamber 42 has passed the outlet port, it has a pressure equal to the entrainment pressure. When the seals revolve to the offset opening 70, the rest of the air pressure is discharged mainly through the offset opening 70 rather than through the hopper 16. The paths taken by the material from the hopper 16 and into the cylinder 12 are explained in greater detail below.

As shown in FIG. 2, the offset opening 70, commonly referred to as defining a chamber, may have a hinged opening cover 72 at its top. This hinged opening cover 72 equalizes the pressure surges built up as a chamber 42 discharges pressure from the cylinder 12 of feeder 10 as the chamber 42 passes beneath the offset opening 70. The hinged opening cover 72 and the offset opening 70 are sized to allow periodic maintenance of the seals and the interior of the feeder 10.

Alternatively, as shown in FIG. 3, the top of the offset opening 70 may instead include a conduit, such as a rubber hose 74, which is vented from the offset opening 70, to the exterior of the cylinder 12, and back into the hopper 16. Any number of hoses may be utilized. However, the number and size of the hoses 74 is dependent upon the type and volume of material intended to be used. Typically, the size of each of the hoses 74 is considerably larger that the hoses utilized in my '067 patent. Preferably, the rubber hoses 74 have about a 2 inch diameter. The discharging air might bear dust or lint that will pass from the offset opening 70 and past opening cover 72 or though the hoses 74 into the hopper 16.

In operation, the feeder 10 provides a pathway 80a–b which passes over the outlet port 52. In FIGS. 2 and 3, the pathway 80a–b is best illustrated by referring to FIGS. 2 and 3. In FIGS. 2 and 3, the portion of the pathway 80a–b where material is placed in the hopper 16 is identified by the solid line referenced as 80a. The pathway 80a–b continues from the hopper and into the cylinder 12 in a clockwise manner. The direction of the rotor is a matter of choice, but the shape of the outlet port 52, as described above, is dependent on the direction of the motor. The material following along the portion of the pathway 80a–b from the bottom of the hopper 16 down to the outlet port 52, and which is discharged through outlet port 52, is not identified by a reference number.

Still referring to FIGS. 2 and 3, the portion of the pathway 80a–b where there is high pressure air in each chamber 42 is shown by a broken line having reference number 80b. The pathway portion 80b in each embodiment passes under the hopper and into the offset opening 70. In FIG. 2, the pathway portion 80b terminates as the high pressure air reaches the exterior of the feeder 10 and out the hinged opening cover 72. In FIG. 3 the high pressure air continues through hoses 74 and back into the hopper 16.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is described by the appended claims and supported by the foregoing description.

What is claimed is:

1. A rotary air lock feeder for delivering a material, comprising:
   a cylinder having a central axis;
   a plurality of vanes extending radially outward to revolve in said cylinder about said axis, said vanes adjacent one another defining a chamber;
   a hopper communicating with said cylinder through an inlet located in an upper portion of said cylinder; and
   at least one offset opening extending from said upper portion of said cylinder along a vertical plane extending from said axis, and said offset opening communicating with said cylinder intermittently providing interchamber communication at said offset opening.

2. The feeder of claim 1 wherein high pressure air discharges through said at least one offset opening to the exterior of said cylinder.

3. The feeder of claim 1 further comprising a pathway at least partially defining a communication path between the interior and exterior of said feeder without passing through said outlet port, said hopper defining a portion of said pathway where said pathway leads into the interior of said cylinder and said cylinder defining a portion of said pathway where said pathway leads through said at least one offset opening.

4. The feeder of claim 3 wherein said pathway communicates with the exterior of said feeder from said at least one offset opening.

5. The feeder of claim 3 wherein said pathway communicates with the interior of said hopper from said at least one offset opening.

6. The feeder of claim 1 wherein the pressure in at least a pair of said chambers adjacent to one another when located in said upper portion of said cylinder is substantially equal to ambient pressure.

7. The feeder of claim 1 wherein a pair of chambers being other than adjacent to another said chamber located at said outlet port are at ambient pressure.

8. The feeder of claim 1 wherein said at least one offset opening provides access to the interior of said cylinder for maintenance.

9. The feeder of claim 1 wherein said cylinder comprises a pair of opposing end walls, one of said end walls comprising an outlet port, said outlet port comprising an outermost lengthwise edge defined by an increasing radius relative to said axis.

10. The feeder of claim 9 wherein said outlet port further comprises a pair of widthwise edges, each of said widthwise edges substantially parallel to said vanes as each said vane passes each said widthwise edge.

11. The feeder of claim 10 wherein one of said vanes is adjacent one of said widthwise edges when another of said vanes is adjacent the other said widthwise edge.

12. The feeder of claim 10 wherein said vanes adjacent said widthwise edges during operation are adjacent one another.

13. The feeder of claim 9 wherein said outlet port further comprises an innermost lengthwise edge defined by a constant radius relative to said axis.

14. The feeder of claim 1 wherein said cylinder comprises a pair of opposing end walls, one of said end walls comprising an outlet port, said outlet port defined by an outermost lengthwise edge defined by an increasing radius relative to said axis, an innermost lengthwise edge defined by a constant radius relative to said axis, and a pair of widthwise edges, each of said widthwise edges substantially parallel to said vanes as each said vane passes each said widthwise edge.

15. The feeder of claim 1 wherein said hopper is at least partially defined by a pair of opposing interior sidewalls for directing material into said cylinder, said hopper comprising a pivotally mounted surface for deflecting material within said hopper, said surface having a distal end extending downward from one of said interior sidewalls of said hopper.

16. The feeder of claim 15 wherein said surface is operable to be actuated from the exterior of said hopper.

17. The feeder of claim 15 wherein the position of said surface relative to said interior sidewall of said hopper from which said surface extends is based upon the type of material passing through said hopper into said cylinder.

18. The feeder of claim 1 wherein communication is established between said hopper and said at least one offset opening during operation of said feeder.

19. The feeder of claim 1 wherein said at least one offset opening is sized relative to each said vane to intermittently permit communication with two said chambers simultaneously during the operation of said feeder.

20. The feeder of claim 1 wherein said at least one offset opening is offset from said vertical plane.

21. The feeder of claim 1 wherein said at least one offset opening is sufficiently sized to straddle each said vane.

22. The feeder of claim 1 wherein the material in each said revolving chamber is removed incrementally by erosion in substantially a continuous and even manner.

23. The feeder of claim 1 wherein a lowermost portion of said hopper is displaceable relative to each passing said vane.

24. A rotary air lock feeder for delivering a material, comprising:
   a cylinder having a central axis, wherein said cylinder comprises a pair of opposing end walls, one of said end walls comprising an outlet port, said outlet port defined by an outermost lengthwise edge defined by an increasing radius relative to said axis, an innermost lengthwise edge defined by a constant radius relative to said axis, and a pair of widthwise edges;
   a plurality of vanes extending radially outward to rotate in said cylinder about said axis, each of said widthwise edges substantially parallel to said vanes as each said vane passes each said widthwise edge;
   a hopper communicating with said cylinder through an inlet located in an upper portion of said cylinder, said hopper comprising a pivotally mounted surface for deflecting material within said hopper, said surface having a distal end extending downward towards said cylinder;
   at least one offset opening extending from said upper portion of said cylinder along a side of a vertical plane extending from said axis, said at least one offset opening communicating with said cylinder intermittently providing inter-chamber communication at said offset opening; and
   a pathway at least partially defining a communication path between the interior and exterior of said feeder without passing through said outlet port, said hopper defining a portion of said pathway where said pathway leads into the interior of said cylinder and said cylinder defining a portion of said pathway where said pathway leads through said offset opening.

25. The feeder of claim 1 wherein said hopper includes a rotor operable about a central axis, said rotor operable to be displaced relative said axis to control flow through said hopper.

* * * * *